United States Patent [19]

von Holdt

[11] Patent Number: 4,756,865
[45] Date of Patent: Jul. 12, 1988

[54] REAR OPENING MOLD PROCESS

[76] Inventor: John W. von Holdt, 6864 Lexington La., Niles, Ill. 60648

[21] Appl. No.: 58,768

[22] Filed: Jun. 5, 1987

Related U.S. Application Data

[62] Division of Ser. No. 838,764, Mar. 12, 1986.

[51] Int. Cl.$^4$ .............................................. B29C 45/44
[52] U.S. Cl. ..................................... 264/334; 264/336; 425/438
[58] Field of Search ...................... 264/40.5, 318, 334, 264/336; 425/438, 441, 450.1, 451.9, 467, 555, 556, 577, DIG. 5, DIG. 58; 249/63, 122, 144, 152, 180, 184

[56] References Cited

U.S. PATENT DOCUMENTS

| | | | |
|---|---|---|---|
| 4,155,698 | 5/1979 | Aichinger | 425/438 |
| 4,286,766 | 9/1981 | von Holdt | 425/DIG. 58 |
| 4,362,291 | 12/1982 | Fuke et al. | 249/63 |
| 4,378,928 | 4/1983 | Kopp et al. | 249/63 |
| 4,502,660 | 3/1985 | Luther et al. | 249/152 |
| 4,533,312 | 8/1985 | von Holdt | 249/152 |
| 4,541,795 | 9/1985 | Cole | 425/438 |
| 4,627,810 | 12/1986 | von Holdt | 425/DIG. 5 |
| 4,648,834 | 3/1987 | von Holdt | 264/334 |

*Primary Examiner*—Jan. H. Silbaugh
*Assistant Examiner*—J. Fortenberry
*Attorney, Agent, or Firm*—Charles F. Pigott, Jr.; Garrettson Ellis

[57] ABSTRACT

A mold, typically an injection mold, comprises a cavity member and a core member relatively movable between open and closed positions to define a first parting line and a molding chamber between the core and cavity members in the closed position. A sprue aperture is provided, communicating with the molding chamber to provide molding compound to the chamber. In accordance with this invention the cavity member defines forward and rearward portions movable between open and closed positions and proportioned whereby objects molded in the molding chamber can be removed from between the forward and rear portions when the cavity member is in its open position.

15 Claims, 6 Drawing Sheets

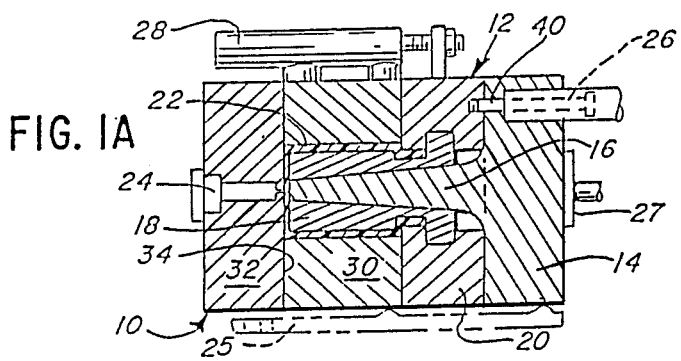
FIG. IA
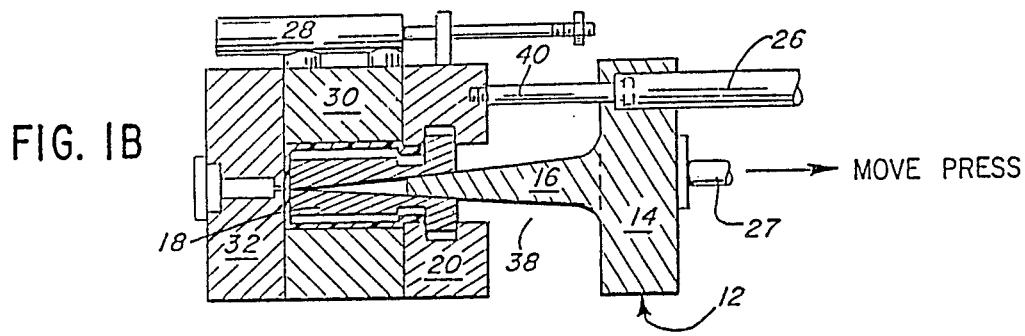
FIG. IB
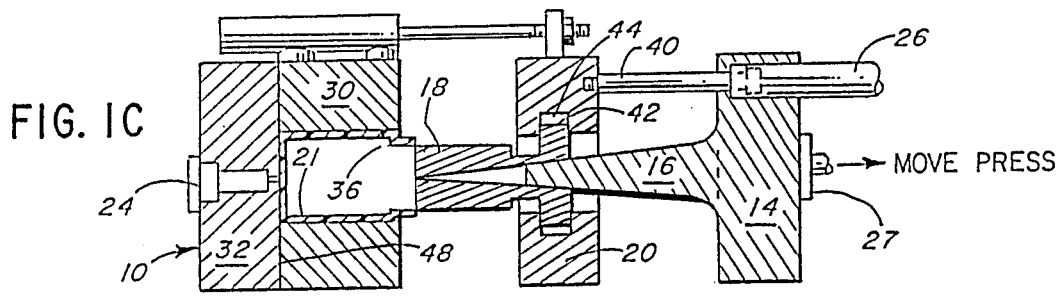
FIG. IC
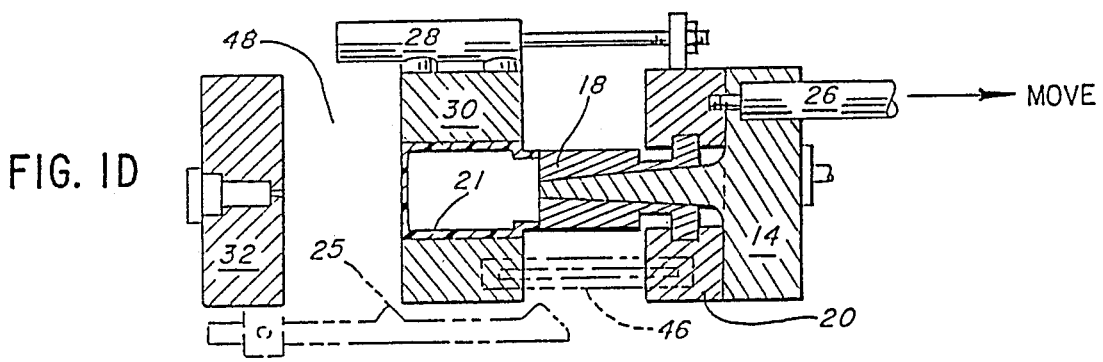
FIG. ID
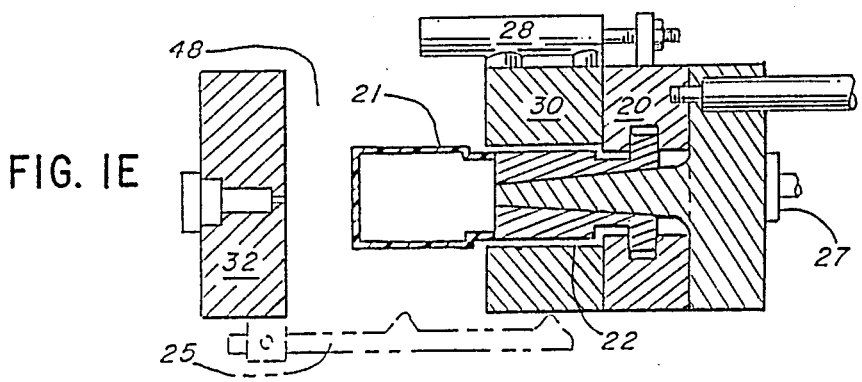
FIG. IE

REAR OPENING MOLD PROCESS

This is a division of application Ser. No. 838,764, filed Mar. 12, 1986.

BACKGROUND OF THE INVENTION

The injection molds currently in use typically comprise a cavity member having a hollow cavity and a core member which fits in the hollow cavity to define the molding chamber between them. The hollow cavity member and the core member are relatively movable by means of a hydraulic or pneumatic system between open and closed positions to define the molding chamber between them in the closed position, and also being capable of opening to remove the molded item, which generally is carried on the core as the mold opens.

In the molding of an item such as a bucket, the rim or other structure may project inwardly from the main portion of the bucket wall. In this circumstance, a collapsible core may be required, for example see Von Holdt patent application No. 781,131, filed Sept. 26, 1985, now U.S. Pat. No. 4,627,810 or Von Holdt U.S. Pat. No. 4,533,312. The collapsible mold cores disclosed in the above references utilize longitudinally slidable outer core members which move along an inner core member or core base between a molding porition and a collapsed position, to make it possible to remove a freshly molded bucket or other item having inwardly projecting members from the core while the core is in collapsed position.

Because the outer members of the collapsible core move longitudinally, conventional molds must open a substantial distance to permit the molded object to fall off of the mold core between the two parts. The opening distance must account for the outer sliding mold core members in their extended position, and also provide additional space to permit removal of the molded object. Such a distance can be very substantial, which of course increases the time required for the opening and closing operation. As a further disadvantage, the extra wide mold opening that is required by means of collapsible cores having longitudinally sliding members may require one to use a higher tonnage mold press to get the increased mold opening capacity, when otherwise a lower tonnage press, which is less expensive, might do perfectly well.

By this invention, a mold can be provided in which a reduced opening distance is required, even when used with a collapsible core that collapses in the longitudinal direction. Hence, the invention of this application may make it possible to use a smaller press, which of course is less expensive, while at the same time providing substantial time saving efficiencies to the molding process. It is frequently possible to reduce the mold cycle time by 25 percent in the manufacture of large buckets and the like through the use of this invention.

DESCRIPTION OF THE INVENTION

In this invention a mold, typically an injection mold, comprises a cavity member and a core member relatively movable between open and closed positions to define a first parting line and a molding chamber between the core and cavity members in the closed position. A sprue aperture is also provided to communicate with the molding chamber for supplying molding compound to the chamber.

In accordance with this invention, the cavity member defines forward and rear portions movable between open and closed positions and proportioned whereby objects molded in the molding chamber can be removed from between the forward and rear portions when the cavity member is in its open position. Accordingly, this invention contemplates removing the molded objects not off of the mold core, but through a parting line which opens up at an intermediate position between two portions of the cavity member. As will be shown herein, the entire range of travel of the moving mold parts can be reduced over analogous prior art molds by this invention, particularly when the core member is of the collapsible type, typically collapsing by longitudinal motion.

The forward portion of the cavity member of this invention may carry tapered sliding members which define at least part of the outer wall of the molding chamber. The sliding members are capable of sliding rearwardly and outwardly from the forward portion of the mold cavity when the cavity member is in its open position. As the tapered sliding members move rearwardly and outwardly, they disengage from the outer surface of articles molded in the molding chamber, which facilitates removal of such articles from the mold. Alternatively or additionally, the rear portion of the cavity member may carry tapered sliding members of similar function, except that they would slide relatively forward.

The entire range of travel of the cavity and core members may be no more than 20 inches beyond the length of the mold in closed position, which provides a significant reduction in the overall travel range of the mold through use of this invention. Thus the mold of this invention may be used to mold rectangular structures such as crates, cylindrical containers such as paint cans or the like, and structures of other shapes.

One may therefore mold in accordance with this invention by first defining a molding chamber between a cavity member and a core member; filling the molding chamber with molding compound, and allowing it to harden; moving the cavity and core members apart, whereby the newly molded object remains in the cavity member rather than on the core member as is generally conventional; opening a rear aperture in the cavity member; and removing the newly molded object from the cavity member through the rear aperture.

It is generally preferred for the molded items in accordance with this invention to have a transverse dimension of at least 6 inches. The result of this is that when the mold core has withdrawn from the molded item, it tends to cool and shrink to a perceptible degree. Thus when one advances the mold core once again to the molded item, it no longer fits on the mold core, so that the core can push the molded item rearwardly out of the mold cavity as the mold is closing.

If desired, the mold of this invention may be a double system using a common center plate, which can serve to be the rear portion of two separate, opposed cavity members. The common center plate is sandwiched between two separate, forward portions of separate cavity members which receive separate mold cores.

DESCRIPTION OF DRAWINGS

Referring to the drawings, FIG. 1A through 1E are a series of diagrammatic representations, taken in longitudinal section, of a molding apparatus in accordance with this invention in various steps of operation;

DESCRIPTION OF SPECIFIC EMBODIMENTS

Figure 2A:
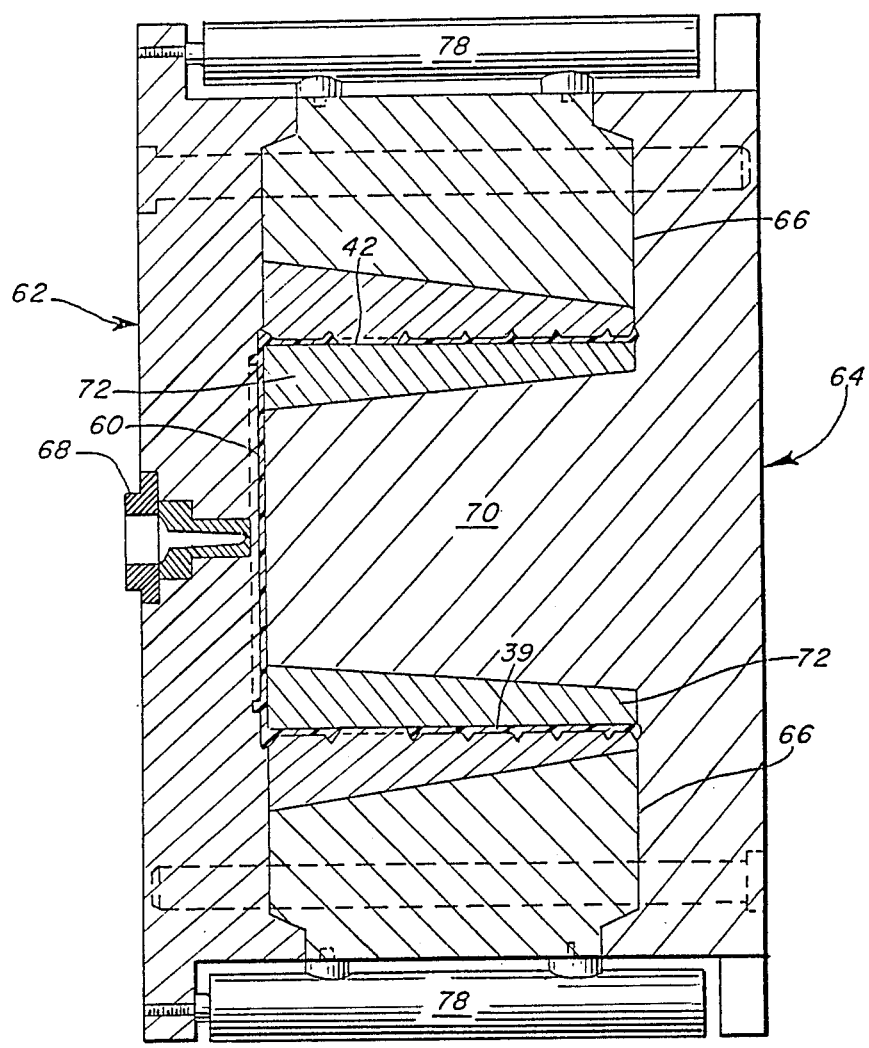
FIGS. 2A through 2C are enlarged views of a mold for manufacturing rectangular crates, the mold being shown in longitudinal section in FIG. 2A and being shown in different positions of operation in the respective figures.

Referring to FIGS. 1A through 1E, an injection mold system is disclosed which comprises cavity member 10 and core member 12, which together define a molding chamber 22 shaped for making cylindrical buckets or cans. As specifically shown, core member 12 is of the design of the previously cited Von Holdt patent application No. 781,131, including a core base 14 which carries an inner core member 16, and collapsible outer core members 18, which are carried by core ring member 20. As core member 12 opens as shown in FIGS. 1B and 1C, core base 14 opens first as in FIG. 1B. Core ring member 20 then opens, causing longitudinal and inward collapse of outer core members 18, so that they may be withdrawn from article 21, which is formed in molding chamber 22 while the mold portions are in their closed position as shown in FIG. 1A. Sprue aperture 24 is of course also provided.

A timing bar 25 may be optionally provided, functioning as described in the previously cited Von Holdt patent Application No. 781,131. Alternatively, if desired, the entire process may be performed with pneumatic hydraulic cylinders which operate according to a prescribed plan of operation. For example, hydraulic cylinder 26 controls the relative position of mold base 14 and mold ring 20, thus correspondingly controlling the positions of inner core member 16 and outer core members 18. Hydraulic cylinder 28 controls the positioning between mold core ring 20 and the forward portion 30 of mold cavity member 10, particularly in facilitating closing of the mold.

Cavity member 10 comprises forward portion 30 as described above, and rear portion 32, which is shown to define sprue aperture 24. Mold cavity portions 30, 32 are separable along parting line 34.

Turning now to the operation of the mold of this invention, one first fills molding chamber 22 with molding compound. It can be seen that the article 21 defines an inwardly projecting shoulder 36 (FIG. 1C) which requires the use of a collapsible core, as is used herein.

In FIG. 1B the mold begins to open, with driver rod 27 (of any design) moving base 14 rearwardly, which causes the corresponding withdrawal of tapered inner core member 16. Outer core members 18 are slidingly affixed to the tapered inner core member 16, so they naturally withdraw inwardly too, as they slide along the tapered surface 38 of inner mold core 16, as mold base 14 moves rearwardly.

FIG. 1C shows the next step in which the mold base 14 is withdrawn by pneumatic or hydraulic driver rod 27. Cylinder 26 becomes a pulling member through rod 40, causing mold core ring 20 to withdraw. Mold core ring 20 carries the various outer mold core members 18 by the action of feet 42 positioned in an internal aperture 44 of core ring 20, causing outer core members 18 to withdraw from the interior of molded item 21, which in this instance may be a cylindrical bucket or can. FIG. 1C shows the extended, collapsed, outer mold members just clearing the molded can 21.

When outer mold members 18 have moved out of contact with molded can 21, it cools relatively rapidly, resulting in a small, predetermined amount of shrinkage. This can permit the walls of can 21 to separate from their intimate relation with the outer walls of the mold chamber 22, which constitute the chamber-forming walls of mold cavity member 10.

In FIG. 1D, it can be seen that hydraulic or pneumatic cylinder 26 has been activated, causing mold core ring 20 to close up against mold base 14. Forward portion 30 of cavity member 10 is also drawn along by the connection provided with cylinder 28, or by an optional sliding connector 46, as may be desired. The effect of this is to open a parting line 48 between forward and rear portions 30, 32 of the mold cavity member.

Thereafter, as shown in FIG. 1E, pneumatic cylinder 28 may be actuated to cause forward portion 30 of the mold cavity to close up on mold core ring 20. In the interim time since outer core members 18 have been withdrawn from molded article 21, the article has had an opportunity to cool and thus shrink. Accordingly, the closing action between forward portion 30 and mold core ring 20 serves to expel the freshly molded can or bucket 20 from forward portion 30, because the mold core can no longer enter bucket 21 because of its shrinkage. Thus, as the configuration of FIG. 1E is reached, bucket 21 falls out of the space 48 defined between forward and rear portions 30, 32 of mold core 10, passing to the side of timing bar 25, if present, which bar may be positioned at one side of the mold.

Thereafter, control rod 27 may be actuated to move the mold back to its position of FIG. 1A, and a new shot of molding compound may be placed into molding chamber 22, to repeat the process.

The mold of this invention may move far less in total distance than a conventional mold for performing the same function. For example, it may move no more than 20 inches beyond the length of the mold in closed position, and with a saving of up to 25 percent or more of time for each shot, which time is consumed in prior art arrangements as the mold opens and closes the necessary extra distance.

The object molded in FIGS. 1A through 1E may be a cylindrical can as stated above. However, rectangular and other objects may also be molded in accordance with this invention. A molding device for manufacturing molded rectangular crates is disclosed in FIGS. 2A through 2C.

Figure 3:
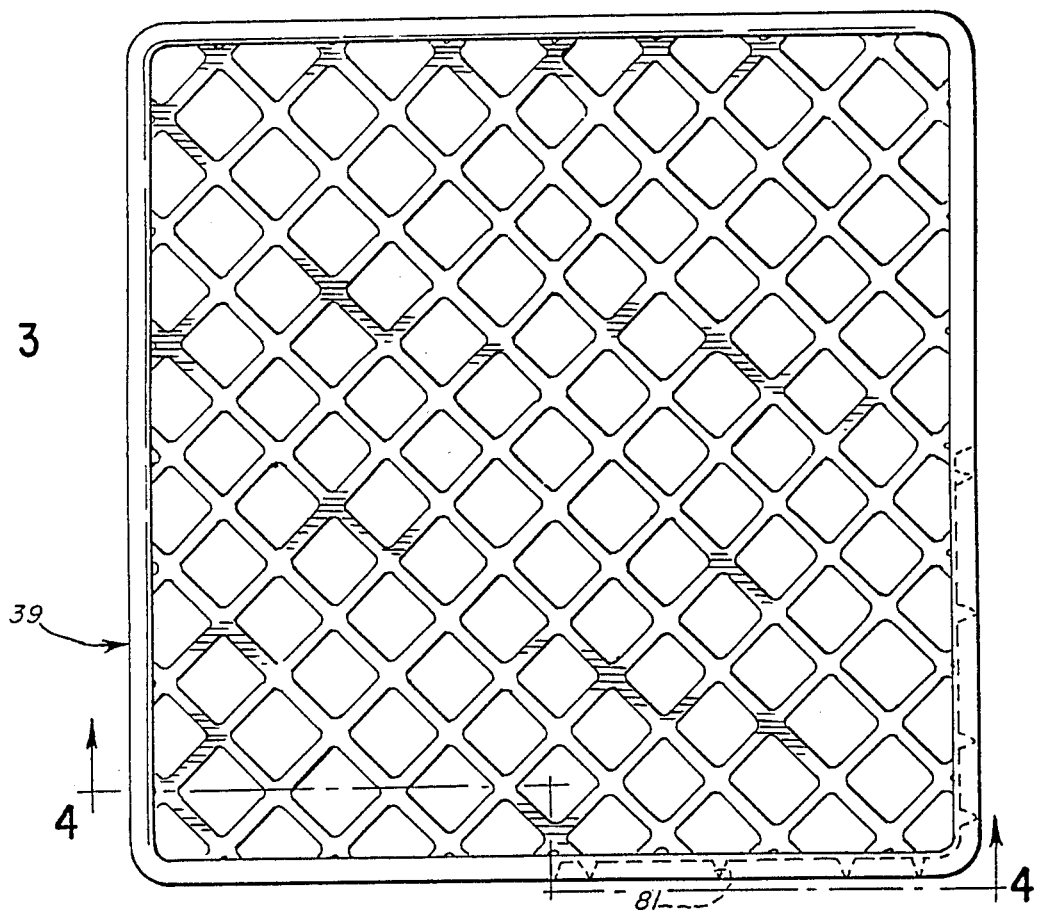
FIG. 3 is a plan view of a rectangular crate as molded in the apparatus of FIG. 2.
Figure 4:
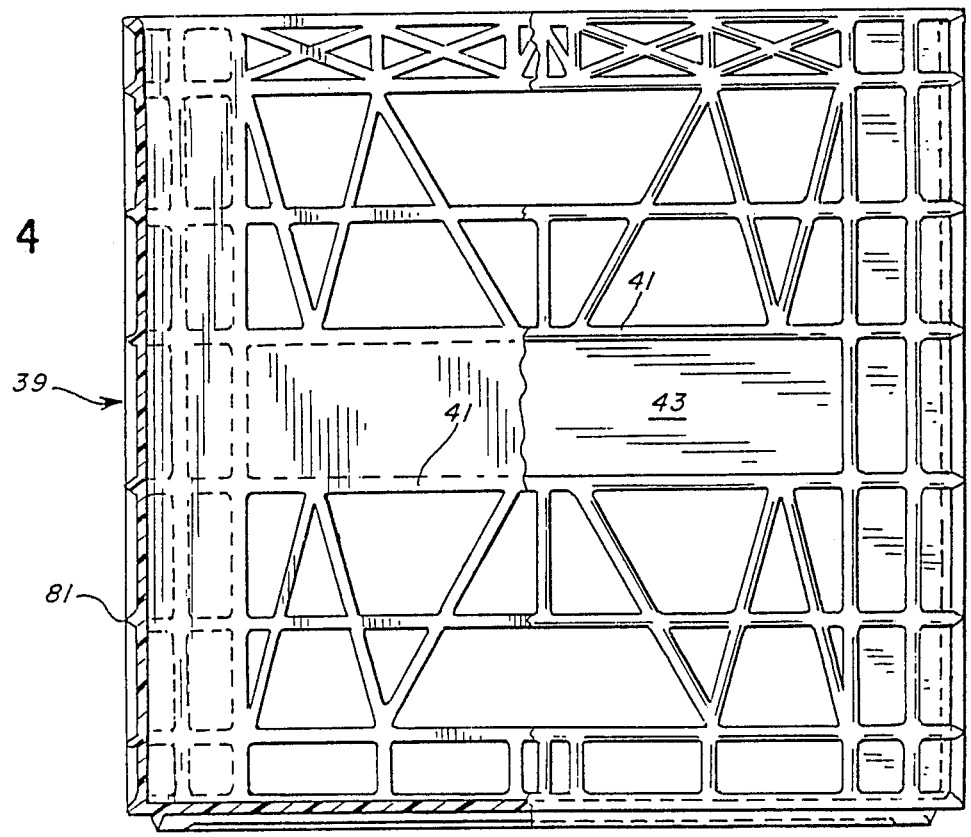
FIG. 4 is a sectional view taken along line 4—4 of FIG. 3.

FIGS. 3 and 4 illustrate the type of rectangular crate 39 so manufactured. The plan view of FIG. 3 shows the apertured bottom of the rectangular crate, while FIG. 4 illustrates a side view both inside and out as shown by the section line in FIG. 3, with the thickened wall members 41 defining apertures in some instances and weblike members 43 in other instances, as may be desired.

As shown in FIG. 2A, the molding chamber 60, and the associated cavity member 62 and core member 64 are relatively movable between open and closed positions to define the first parting line 66 and molding chamber 60. Conventional means may be used to move the cavity and core members between open and closed positions. Rectangular crate 39 is formed in molding chamber 60 by molding compound entering through sprue 68.

Figure 2B:
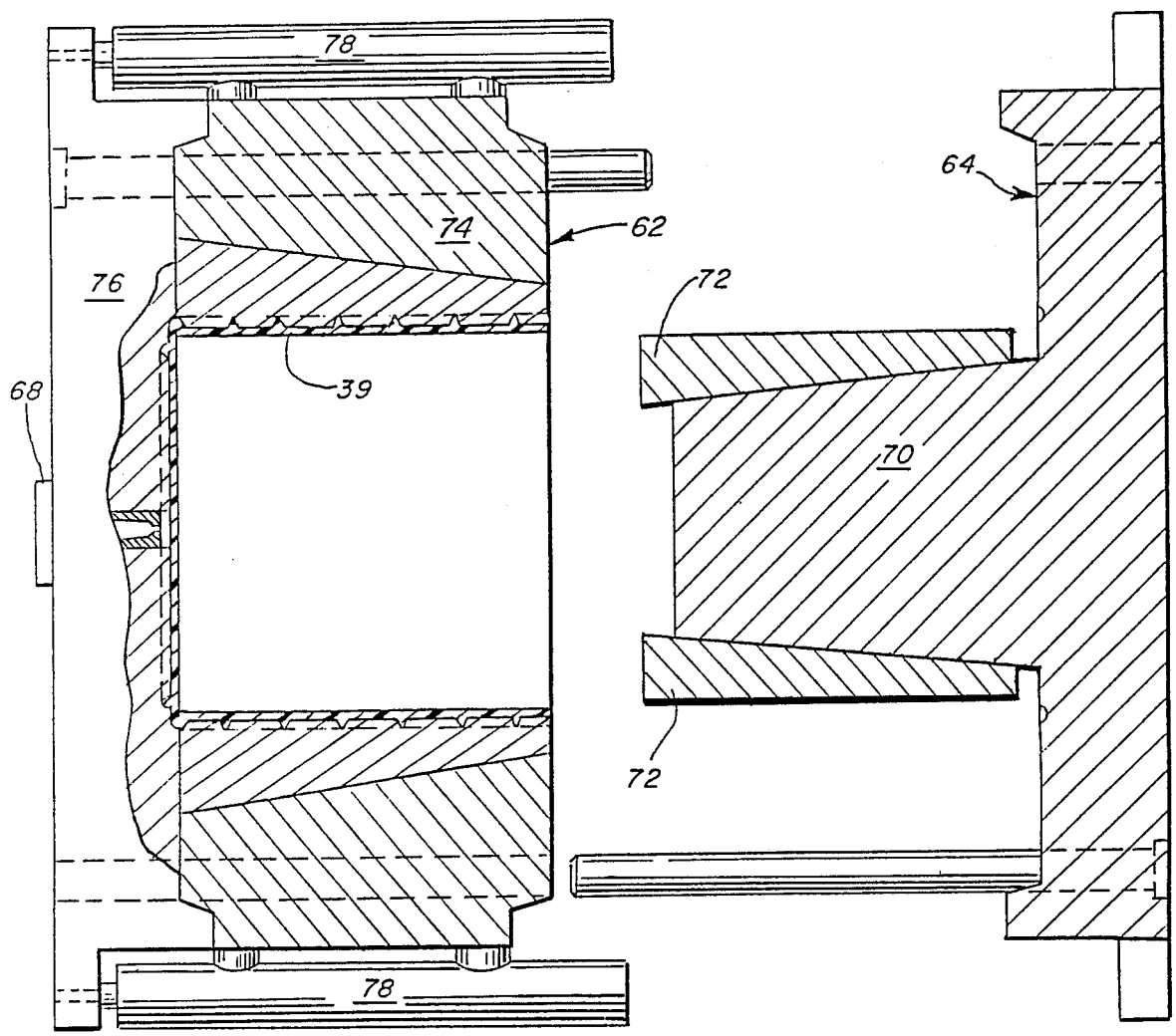
Figure 2C:
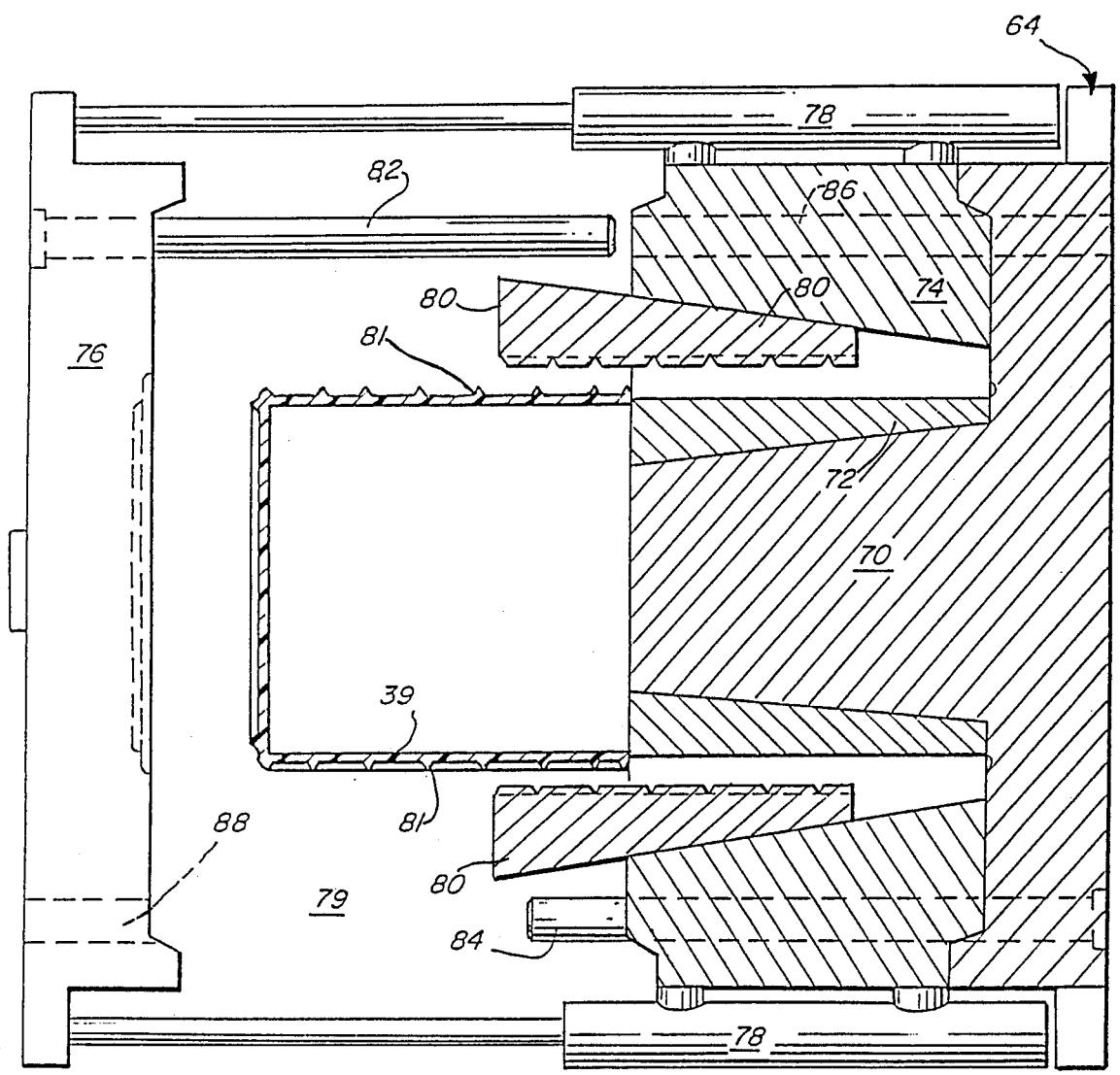

After the molding compound forming crate 39 has hardened, the cavity and core members open to the configuration of FIG. 2B. As in the previous embodiment, mold core 64 may include an inner core portion 70, and sliding outer core members 72 which slide inwardly as they extend longitudinally outwardly, to free the inner surface of crate 39 from contact with the mold core. Crate 39 thus moves with mold cavity 62.

As before, mold cavity 62 has forward portion 74 and rear portion 76 which are movable, actuated by hydraulic or pneumatic cylinders 78 between open and closed positions. Thus, in FIG. 2C, forward portion 74 is shown to have been advanced by cylinders 78 back into contact with mold core 64, while spacing itself from rear portion 76. This causes the outer and inner core portions 70, 72 to attempt to penetrate back into the interior of crate 39. However, if crate 39 has cooled and shrunk by a predetermined amount, it is no longer possible for outer and inner core portions 70, 72 to penetrate back into the crate. Thus, instead, crate 39 is pushed rearwardly into the space 79 between forward and rear cavity portions 74, 76 by the closing of forward cavity portion 74 and mold core 64, causing crate 39 to fall out of the mold between the respective parts. Tapered, sliding members 80 may be provided in forward portion 74 to facilitate the rearward motion of crate 39 and its separation from slide members 80, since the slide members slide outwardly as they move rearwardly in a manner analogous to members 18 and 72. This may be particularly used when crate 39 has outwardly projecting members 81 which are caught in the outer surfaces of the mold chamber, until tapered sliding members 80 which form such outer surfaces, slide rearwardly and outwardly.

Following this, mold core 64 and forward portion 74 of the cavity may be reclosed to assume the configuration of FIG. 2A again, ready for another shot.

Alignment pins 82, 84 fit into respective holes 86, 88 to help align the various portions of the mold, and to provide transverse rigidity during the molding process.

Referring to FIGS. 5A through 5E, a molding apparatus is shown for manufacture of a bucket 90 which carries projecting side members 92, which may be mounting sites for a wire handle or the like. Because projecting members 92 are present, the mold of FIGS. 1A-1E must be modified, for example in the manner shown herein, but the mold of FIGS. 5A through 5E may be similar to the mold of FIGS. 1A-1E except as otherwise specified.

Cavity member 10A and core member 12A are provided as in the previous embodiment. However, forward portion 30A of the cavity member is considerably smaller, and rear portion 32A is larger since the parting line 34A between them is in a relatively forward position compared with the previous embodiment so that the rear side of the projecting chamber 92 may be defined by portion 32A and the forward side by portion 30A.

As before, core member 12A includes core base 14A which caries inner core member 16A collapsible outer core members 18A are carried by core ring member 20A, all in a manner similar to the previous embodiment. Sprue aperture 24A is provided as in the previous embodiment.

Figure 5A:
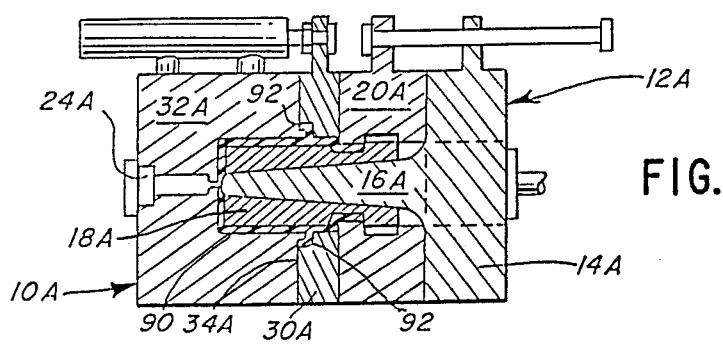
FIGS. 5A through 5E are diagrammatic representations, taken in longitudinal section, of another molding apparatus of this invention in various steps of operation.
Figure 5B:
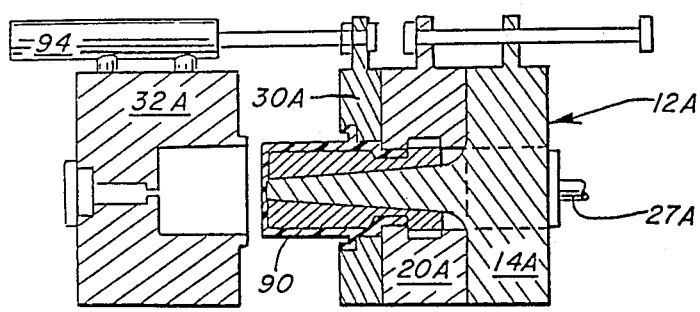
Figure 5C:
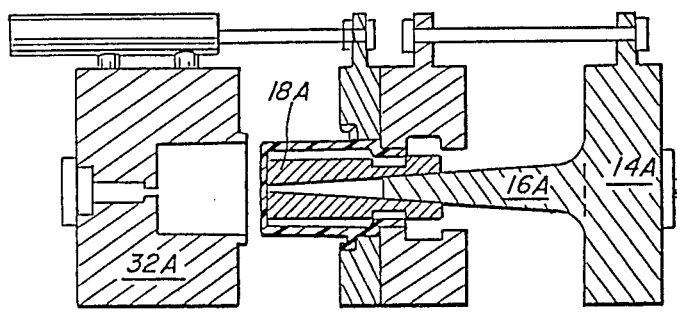

In FIG. 5A the system is shown in its molding position in which bucket or other container 90 has been freshly molded in the molding aperture. Turning to FIG. 5B, the first opening action is provided by hydraulic or pneumatic cylinder 94, causing movement of forward portion 30A away from rear portion 32A of cavity member 10A, carrying all of core portion 12A and newly molded bucket 90 with it.

Figure 5D:
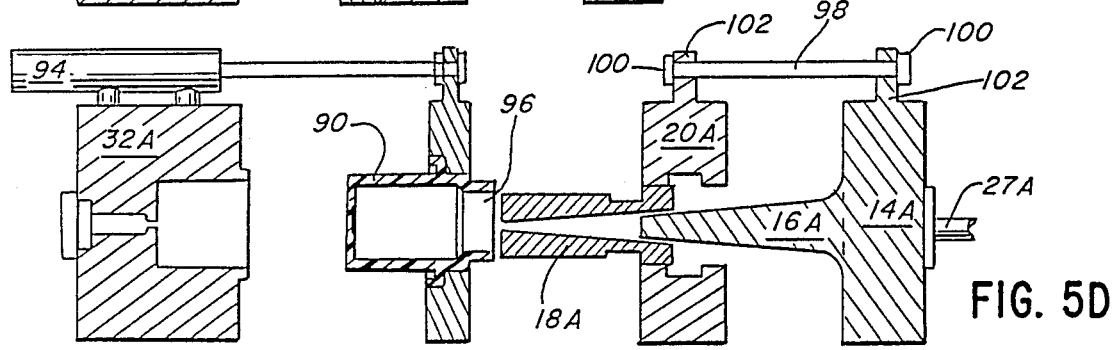
Figure 5E:
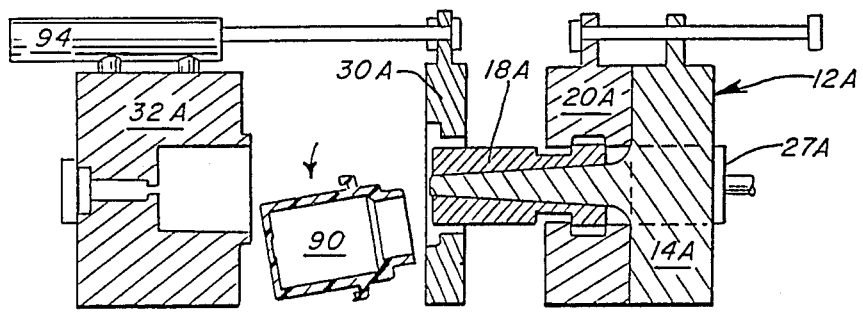

Following this, hydraulic or pneumatic cylinder means 27A causes core base 14A to open, bringing inner core member 16A with it. This now permits outer core members 18A to collapse so they slide along inner core member 16A, so that they can be withdrawn, as shown in FIG. 5D, from the mouth 96 of container 90 as means 27A continues to withdraw core base 14A. A sliding link connection is provided between core base 14A and core ring 20A so that after core base 14A has withdrawn a predetermined distance, core ring 20A is pulled along after it. This sliding link may comprise a rod 98 having heads 100 on both ends captured in projecting apertures 102 of each of members 14A and 20A.

Then, after outer core members 18A have been withdrawn from bucket 90, and the bucket has been given a chance to cool, moving means 27A is reversed to cause core base 14A to advance inner core member 16A back into its position between outer core members 18A, causing them to expand again. Since bucket container 90 has now shrunk a little bit on cooling, the closing core member 12A pushes bucket 90 out of its seat in member 30A, causing it to fall out of the mold as in FIG. 5E. The mold then closes again to the configuration of FIG. 5A ready for the next shot.

Thus, the mold of this invention can operate with a net reduction in the opening distance required for operation of the mold, and also with reduced cycle time, for significant manufacturing advantages and economies.

The above has been offered for illustrative purposes only, and is not intended to limit the scope of the invention of this application, which is as defined in the claims below.

That which is claimed is:

1. The method of molding, which comprises: defining a molding chamber between a cavity member and a core member; filling the molding chamber with molding compound and allowing it to harden; moving the cavity and core members apart, whereby the newly molded object remains in the cavity member; waiting for the newly molded object to shrink to such a degree that significant resistance is encountered upon an attempt to insert the core member back into the molded object; opening a rear aperture in the cavity member; moving the core and cavity members together, whereby the newly molded object is pushed out of the cavity member through said rear aperture by the core member.

2. The method of claim 1 including the step of thereafter closing the rear aperture and repeating the process.

3. The method of claim 1 in which said core member is of the collapsible type.

4. The method of claim 1 in which the forward portion of said cavity member carries tapered sliding members which define at least part of the outer wall of said molding chamber, said sliding members sliding rearwardly and outwardly from said forward portion as the newly molded object is pushed out of the cavity member to disengage said object.

5. The method of claim 1 in which the molding chamber is proportioned to mold crates of rectangular cross-section.

6. The method of claim 1 in which the molding chamber is proportioned to mold cylindrical containers.

7. The method of claim 1 in which said cavity member and core member move in their opening motion no more than 20 inches beyond the length of said mold in closed position.

8. The method of claim 1 in which the objects molded therein are at least 6 inches wide.

9. The method of molding, which comprises: defining a molding chamber between a cavity member and a core member; filling the molding chamber with molding compound and allowing it to harden; moving the cavity and core members apart, whereby the newly molded object remains in the cavity member; waiting for the newly molded object to shrink to such a degree that significant resistance is encountered upon an attempt to insert the core member back into the molded object; opening a rear aperture in the cavity member; moving the core and cavity members together, whereby the newly molded object is pushed out of the cavity member through said rear aperture by the core member, with tapered sliding members, which define at least part of the outer wall of said molding chamber and engaging said newly molded object, moving rearwardly but outwardly with said newly molded object to disengage from outwardly projecting members on the newly molded object as said newly molded object is ejected rearwardly for removal.

10. The method of claim 9 including the step of thereafter closing the rear aperture and repeating the process.

11. The method of claim 10 in which said core member is of the collapsible type.

12. The method of claim 11 in which the entire range of travel of said cavity member and core member is no more than 20 inches beyond the length of said mold in closed position.

13. The method of claim 12 in which the objects molded therein are at least 6 inches wide.

14. The method of claim 9 in which the molding chamber is proportioned to mold crates of rectangular cross-section.

15. The method of claim 13 in which the molding chamber is proportioned to mold cylindrical containers.

* * * * *